United States Patent [19]

Master

[11] 4,209,985
[45] Jul. 1, 1980

[54] TRANSMISSION CONTROL SYSTEM

[75] Inventor: Ralph E. Master, Washington, Ill.

[73] Assignee: Caterpillar Tractor Co., Peoria, Ill.

[21] Appl. No.: 973,047

[22] Filed: Dec. 11, 1978

[51] Int. Cl.² .............................................. F16D 33/00
[52] U.S. Cl. ........................................ 60/337; 60/456;
60/494; 60/DIG. 5
[58] Field of Search ................. 60/337, 357, 358, 456,
60/DIG. 5, 361, 494

[56] References Cited

U.S. PATENT DOCUMENTS

| | | | |
|---|---|---|---|
| 3,096,667 | 7/1963 | Dickeson et al. | 74/731 |
| 3,347,042 | 10/1967 | Horsch | 60/337 |
| 3,444,968 | 5/1969 | Golan et al. | 192/4 |

*Primary Examiner*—Edgar W. Geoghegan
*Attorney, Agent, or Firm*—Charles E. Lanchantin, Jr.

[57] ABSTRACT

A transmission control system (10) for a transmission including a torque converter (66) has fluid inlet and fluid outlet passages (64,80) connected to the torque converter (66), a pressure regulating valve (20) for relieving fluid from a pressure source (12,16) to the inlet passage (64) of the torque converter (66), and a flow limiting passage (96) directly connecting the inlet and outlet passages (64,80) for continually bypassing fluid past the torque converter (66) and controlling the pressure drop thereacross.

5 Claims, 2 Drawing Figures

TRANSMISSION CONTROL SYSTEM

DESCRIPTION

TECHNICAL FIELD

The present invention relates to a transmission control system, and more particularly to a control system for improved fluid flow control with respect to a torque converter and an associated heat exchanger.

BACKGROUND ART

The Warner Gear Division of Borg-Warner Corporation located at Muncie, Indiana, manufactures a single-speed transmission known as a Model PR1 Power Ranger Shuttle Transmission. This transmission is used with a Model No. W11 torque converter manufactured by the Borg & Beck Division of Borg-Warner Corporation and located at Sterling Heights, Michigan. That transmission and associated hydraulic torque converter find particular utility in the power train of a fork lift truck, for example.

The referenced transmission and torque converter has heretofore utilized a transmission control system that has experienced fluid flow control problems including undesirable pressure fluctuations at the fluid inlet passage to the torque converter. Moreover, a pressure relief valve or regulator incorporated in that transmission control system has undesirably relieved an excessive proportion of fluid from the inlet passage of the torque converter directly to the outlet of a cooler which receives and cools fluid from the outlet passage of the torque converter. Thus, under certain conditions an undesirable portion of the circulating fluid bypasses the cooler via that relief valve, so that the torque converter cooler flow rate did not uniformly increase over the operating range as desired.

A large number of valves are known which can modulate and control the fluid flow rate to and from a torque converter or alternately the pressure at the inlet and/or outlet thereof. Some valves can even control multiple combinations of these parameters. However, these valves are not only usually complex and costly in construction, but also they take up valuable room where space is at a premium. Still further, what is needed is a solution to the aforementioned problems that can be incorporated in commercially available transmission control systems with but minimal delay to the ultimate consumer.

The present invention is directed to overcoming one or more of the problems as set forth above.

DISCLOSURE OF INVENTION

In accordance with one aspect of the present invention a flow limiting passage directly connects a fluid inlet passage to a torque converter and a fluid outlet from the torque converter. Thus, although a preselected amount of fluid is caused to continually bypass the torque converter, such amount is still desirably directed to the torque converter cooler.

Advantageously, because of the incorporation of the controlled fluid flow bypass passage around the torque converter, a pressure relief valve associated with the transmission control system is no longer adversely affected by back pressure fluctuations at the inlet passage to the converter, and also the fluid flow rate through both the cooler and the torque converter increase uniformly in proportion to an increase in the torque converter input speed.

BEST MODE FOR CARRYING OUT THE INVENTION

Figure 1:
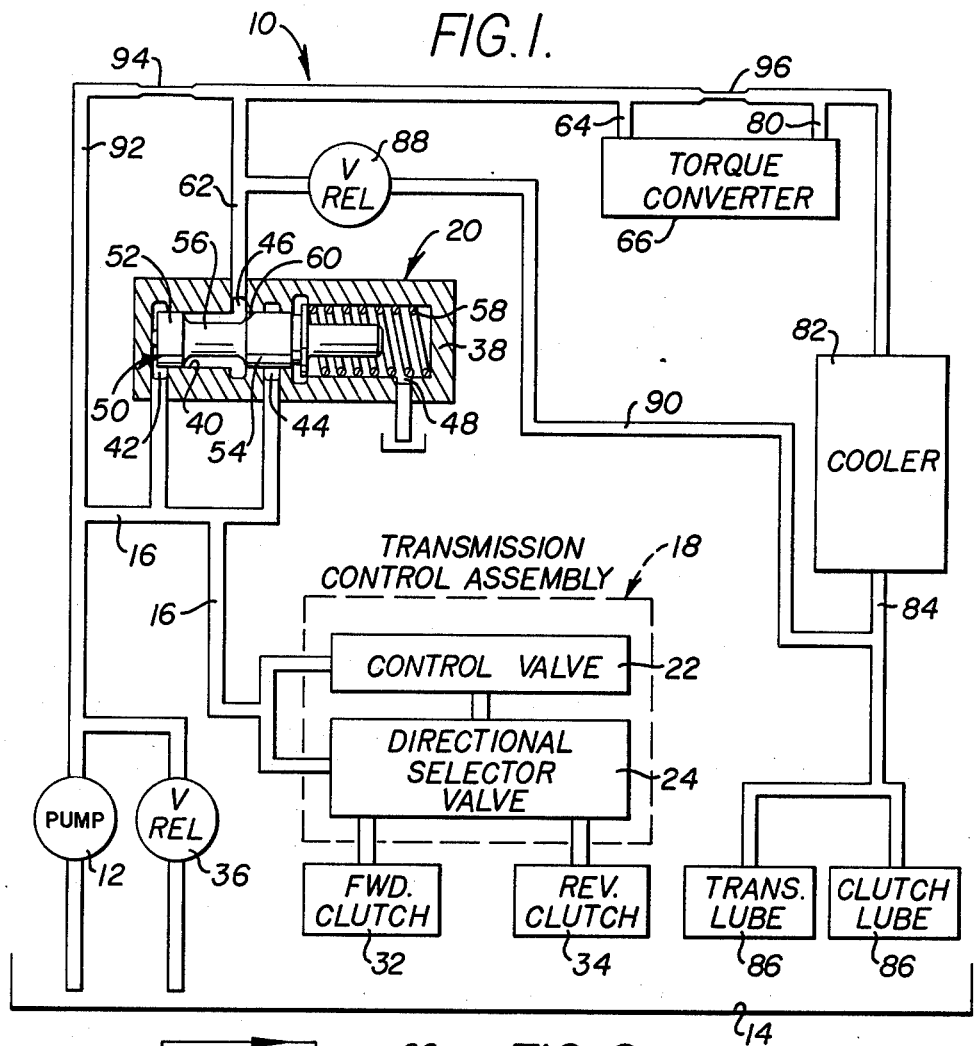
FIG. 1 is a diagrammatic view of one embodiment of the transmission control system of the present invention with a portion of the valving shown therein broken open to better illustrate details thereof.

Referring initially to FIG. 1, a transmission control system 10 is shown as having a pump 12 which draws fluid from a sump 14 and directs it through a main line conduit 16 as a fluid pressure source to a transmission control assembly 18 and to a pressure regulator valve or pressure relief valve 20. The transmission control assembly 18 includes a control or inching valve 22 connected to the pressure source and a directional selector valve 24 connected to the control valve 22 and the pressure source. Manual control of the directional selector valve enables a forward clutch 32 or a reverse clutch 34 to be controllably supplied with pressure fluid for operation of the associated vehicle. Such transmission control assembly 18 can be of conventional construction, such as has been heretofore incorporated on the previously mentioned Model PR1 Power Ranger Shuttle Transmission, produced by Borg-Warner Corporation.

A known pressure relief valve 36 is connected to the main line conduit 16 to provide a preselected maximum pressure level thereat. For example, at a setting of about 1380 KPa (200 psi) the relief valve 36 relieves fluid from the main line conduit back to the sump 14.

The pressure regulator valve 20 has a housing 38 defining an elongate cylindrical bore 40, a pressure port 42, an inlet port 44, an outlet port 46, and a drain port 48, all communicating with the bore. A valve spool 50 having a pair of spaced apart cylindrical lands 52, 54 and a neck 56 is reciprocably disposed in the bore, and the valve spool is continually biased to the left when viewing the drawing by a compression spring 58. A preselected pressure at the pressure port 42, for example of about 830 KPa (120 psi), serves to overcome the spring and move the spool to the right when viewing the drawing. A throttling slot 60 formed in the land 54 is then placed in open communication with the inlet port 44, whereupon fluid in the main line conduit 16 is relieved to an outlet conduit 62 via the inlet port, the throttling slot and the outlet port 46. A major purpose of the pressure regulating valve 20 is to cut off fluid flow to the torque converter 66 when the pressure in the main line conduit drops below its preselected pressure level setting, and thus to assure that the transmission control assembly 18 will get full benefit of this available flow from the pump 12 for fast response during a transmission shift.

Figure 2:
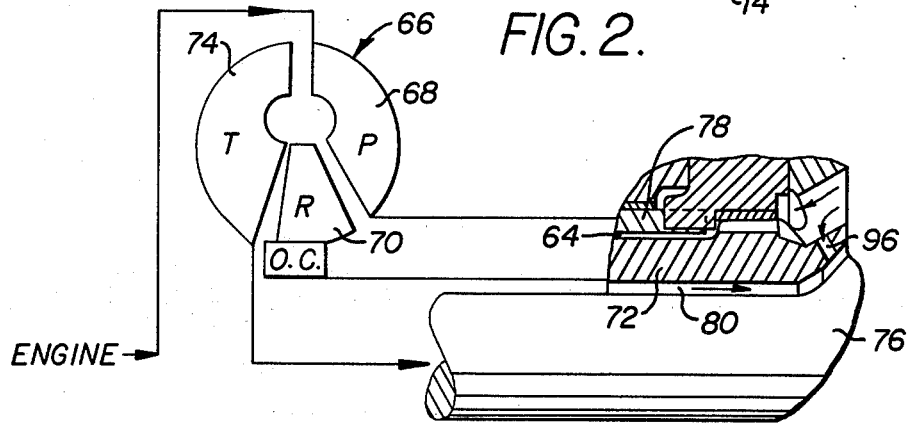
FIG. 2 is a diagrammatic view of the torque converter shown in FIG. 1, with a fragmentary portion thereof shown in cross section to illustrate certain fluid passages therein.

Fluid in the outlet conduit 62 from the regulating valve 20 is directed to an inlet passage 64 leading to a hydrodynamic torque converter 66. As shown in FIG. 2, this torque converter has a pump or impeller element 68 coupled to an engine, not shown, a reactor element 70 suitably coupled to a stationary tubular member 72, and a turbine element 74 connected to a rotary shaft 76 leading to a transmission, not shown.

Basically, the torque converter is similar in construction to the Model W11 torque converter produced by Borg & Beck and the transmission is similar in construction to the Model PR1 Power Ranger Shuttle Transmission produced by Warner Gear as previously mentioned. With the construction of the torque converter 66 shown in FIG. 2 it is apparent that fluid charging pressure is directed to the torque converter via the inlet passage 64 located in part between the tubular member 72 and a surrounding rotary member 78. Fluid is communicated from the torque converter via an outlet passage 80 defined in part between the shaft 76 and the tubular member 72. Because of such relationship the inlet and outlet passages 64 and 80 present some restriction to fluid flow.

Referring again to FIG. 1, from the outlet passage 80 of the torque converter 66 heated fluid flows to a cooler or heat exchanger 82 where its temperature is desirably reduced prior to being passed on to a conduit 84 and to a plurality of lubrication points 86.

A pressure relief valve 88 of known construction is in fluid communication with the conduit 62 leading to the inlet passage 64 of the torque converter 66 such that at a preselected pressure thereat, for example about 900 KPa (130 psi), fluid is allowed to flow from the conduit 62 to a conduit 90 and the conduit 84 in bypassing relation to the cooler 82. This relief valve protects the torque converter 66 by limiting the maximum pressure level at the inlet passage thereto.

A branch conduit 92 having a flow control orifice 94 therein is connected between the main line conduit 16 and the inlet passage 64 of the torque converter 66. The flow control orifice is preferably about 1.52 mm (0.060") in diameter so that a fluid flow rate of about 1.9 to 3.8 liters/min. (½ to 1 gpm) will be directly communicated to the inlet passage of the torque converter to insure that it is supplied with at least a preselected minimum amount of fluid at all times, such as during a transmission shift when the pressure regulator valve 20 is closed.

In accordance with the present invention, a flow limiting passage 96 having an effective orifice diameter of about 3.8 mm (0.150") is directly connected between the inlet passage 64 and the outlet passage 80 in fluid bypassing relation to the torque converter 66. In this way, a preselected proportion of the fluid flow to the inlet passage 64 can be continually passed directly to the cooler 82.

INDUSTRIAL APPLICABILITY

In actual operation of the transmission control system 10, the input speed of the impeller 68 of the torque converter 66 varies with engine speed, for example from about 1000 to 2400 rpm. With the transmission in neutral the fluid flow rate through the torque converter desirably increases relatively uniformly from about 7.6 to 18.9 liters/min. (2 to 5 gpm). Simultaneously, the cooler flow rate desirably increases relatively uniformly from about 15.1 to 30.3 liters/min. (4 to 8 gpm). Thus a flow rate of about 7.6 to 11.4 liters/min. (2 to 3 gpm) continually occurs through the torque converter bypass passage 96.

This contrasts sharply with the operation of the known transmission control system without the flow limiting a bypass passage 96, wherein the flow rate increased across the cooler with increasing engine speed only up to the point where the back pressure at the inlet passage 64 to the torque converter became so high and erratic that the relief valve 88 located thereat opened. This undesirably influenced the pressure level in the main line conduit in the torque converter, and also adversely affected operation of the transmission control assembly 18. Moreover, the increased quantity of fluid passing through the relief valve 88 did not pass through the cooler 82 contributing to an undesirable build up in the fluid temperature of the transmission control system 10.

As best shown in FIG. 2, the flow limiting passage 96 is preferably located in the region of the torque converter 66. For example, the flow limiting passage 96 can be defined in the tubular member 72 operatively connected to the converter reactor element 70. In the embodiment illustrated the flow limiting passage 96 extends radially through the tubular member to be in direct fluid communication with the inlet and outlet passages 64, 80 located thereat. In such location the flow limiting passage results in immediately improved operating performance of the transmission control assembly, without the need to provide another valve to solve the previously set forth problems or without any significant change to the system.

Other aspects, objects and advantages of this invention can be obtained from a study of the drawings, the disclosure and the appended claims.

I claim:

1. In a transmission control system (10) for a transmission including a torque converter (66), and of the type having fluid inlet and outlet passages (64,80) leading respectively to and from the torque converter (66), a source of fluid pressure (16), and a pressure regulating valve (20) for relieving fluid from the source (16) at a preselected pressure to the fluid inlet passage (64), the improvement comprising:
   a flow limiting passage (96) directly connecting said fluid inlet and outlet passages (64,80) to said torque converter (66).

2. The transmission control system (10) of claim 1 wherein said torque converter (66) includes a turbine element (74), a rotary shaft (76) connected to the turbine element (74), and a tubular member (72) surrounding the rotary shaft (76), the flow limiting passage (96) being defined in said tubular member (72).

3. The transmission control system (10) of claim 2 wherein said torque converter (66) has a reactor element (70) and said tubular member (72) is connected to said reactor element (70).

4. A transmission control system (10) comprising:
   a hydrodynamic torque converter (66);
   fluid inlet and outlet passages (64,80) connected to said torque converter (66);
   a fluid pressure source (12,16);
   pressure regulating valve means (20) for relieving fluid from said source (12,16) at a first preselected pressure to said inlet passage (64);
   pressure relief valve means (88) for relieving fluid from said inlet passage (64) at a second preselected pressure above said first preselected pressure; and
   a flow limiting passage (96) directly connecting said fluid inlet and outlet passages (64,80) and being of a construction sufficient for continually and controllably bypassing fluid around said torque converter (66).

5. The transmission control system (10) of claim 4 wherein said torque converter (66) includes a tubular member (72), said inlet and outlet passages (64,80) are located radially interiorly and exteriorly of said tubular member (72), and said flow limiting passage (96) is defined through said tubular member (72).

* * * * *